United States Patent
Vandermeijden et al.

(10) Patent No.: US 12,019,832 B2
(45) Date of Patent: Jun. 25, 2024

(54) LOW GROUND MASS MITIGATION FOR PENS

(71) Applicant: Synaptics Incorporated, San Jose, CA (US)

(72) Inventors: Tom Vandermeijden, San Jose, CA (US); Kirk Hargreaves, Mountain View, CA (US); Robert Bolender, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 109 days.

(21) Appl. No.: 17/724,279

(22) Filed: Apr. 19, 2022

(65) Prior Publication Data

US 2022/0357812 A1     Nov. 10, 2022

Related U.S. Application Data (60) Provisional application No. 63/184,757, filed on May 5, 2021.

(51) Int. Cl.
*G06F 3/044* (2006.01)
*G06F 3/0354* (2013.01)

(52) U.S. Cl.
CPC ........ *G06F 3/0442* (2019.05); *G06F 3/03545* (2013.01); *G06F 3/0446* (2019.05)

(58) Field of Classification Search
CPC .. G06F 3/03545; G06F 3/0442; G06F 3/0446; G06F 3/04166
See application file for complete search history.

(56) References Cited

U.S. PATENT DOCUMENTS

| | | | | |
|---|---|---|---|---|
| 10,001,847 | B2* | 6/2018 | Chang | G06F 3/03545 |
| 10,162,438 | B2* | 12/2018 | Chang | G06F 3/0446 |
| 10,254,861 | B2* | 4/2019 | Chang | G06F 3/0442 |
| 10,261,610 | B2* | 4/2019 | Chang | G06F 3/03545 |
| 10,503,288 | B2* | 12/2019 | Chang | G06F 3/04162 |
| 2017/0262071 | A1* | 9/2017 | Chang | G06F 3/0442 |
| 2017/0262081 | A1* | 9/2017 | Chang | G06F 3/03545 |
| 2017/0262122 | A1* | 9/2017 | Chang | G06F 3/03545 |
| 2018/0267632 | A1* | 9/2018 | Chang | G06F 3/03545 |
| 2019/0187818 | A1* | 6/2019 | Chang | G06F 3/0446 |

OTHER PUBLICATIONS

USI_Universal Stylus Initiative, "Stylus and DeviceTechnical Specification 1.0"; Jun. 30, 2016 (181 pages).
USI_Universal Stylus Initiative, "Stylus and Device Technical Specification 1.0—Errata 1.06"; Jun. 7, 2019 (44 pages).

* cited by examiner

*Primary Examiner* — Michael Pervan
(74) *Attorney, Agent, or Firm* — Leydig, Voit & Mayer, Ltd.

(57) ABSTRACT

Low ground mass mitigation for pens includes sensing circuitry configured to transmit, during a first frame, a beacon signal on a first subset of sensing electrodes, the first subset being along a first axis of an input device, transmit, during a second frame, the beacon signal on a second subset of the sensing electrodes, the second subset being along the first axis and different from the first subset, and receive a pen signal transmitted responsive to the beacon signal. The processing circuitry is configured to detect a location of a capacitive pen using the pen signal.

19 Claims, 8 Drawing Sheets

LOW GROUND MASS MITIGATION FOR PENS

CROSS-REFERENCE TO RELATED APPLICATIONS

This application is a non-provisional application of, and therefore, claims benefit under 35 U.S.C. 119(e), to U.S. Patent Application Ser. No. 63/184,757, filed on May 5, 2021. U.S. Patent Application Ser. No. 63/184,757 is incorporated by reference in its entirety.

FIELD

This invention generally relates to electronic devices and method for low ground mass mitigation for uplink signals for capacitive pens.

BACKGROUND

Input display devices adapted to both image displaying and proximity sensing are widely used as user-interfaces of electronic systems. An input display device may include a display panel and an array of sensor electrodes disposed neighboring or integrated in the display panel. The input-display device may be configured to display an image on the display panel while sensing one or more input objects located on or near the display panel based on resulting signals received from the sensor electrodes.

One function of an input display device is to detect and track a capacitive pen (e.g., an active stylus) in a sensing region of an input device. To detect and track capacitive pens, the input display device transmits an uplink signal, which is used to perform synchronization between the capacitive pen and the input display device. However, if the capacitive pen does not detect the uplink signal, then the synchronization is not performed and the capacitive pen signals are not detected.

SUMMARY

In general, in one aspect, one or more embodiments relate to a processing system that includes sensing circuitry and processing circuitry. The sensing circuitry is configured to transmit, during a first frame, a beacon signal on a first subset of sensing electrodes, the first subset being along a first axis of an input device, transmit, during a second frame, the beacon signal on a second subset of the sensing electrodes, the second subset being along the first axis and different from the first subset, and receive a pen signal transmitted responsive to the beacon signal. The processing circuitry is configured to detect a location of a capacitive pen using the pen signal.

In general, in one aspect, one or more embodiments relate to a method that includes transmitting, during a first frame, a beacon signal on a first subset of sensing electrodes, the first subset being along a first axis of an input device, and transmitting, during a second frame, the beacon signal on a second subset of the sensing electrodes, the second subset being along a first axis and different from the first subset. The method further includes receiving a pen signal transmitted responsive to the beacon signal, and detecting a location of a capacitive pen using the pen signal.

In general, in one aspect, one or more embodiments relate to an input device configured to detect an input object proximate the input device that includes sensor electrodes comprising a first subset and a second subset and a processing system. The sensor electrodes are configured to transmit, during a first frame, a beacon signal on a first subset of the sensing electrodes, the first subset being along a first axis of the input device, transmit, during a second frame, the beacon signal on the second subset, the second subset being along a first axis and different from the first subset, and receive a pen signal responsive to the beacon signal. The processing system is coupled to the sensor electrodes. The processing system is configured to detect a location of a capacitive pen using a pen signal.

Other aspects of the invention will be apparent from the following description and the appended claims.

BRIEF DESCRIPTION OF DRAWINGS

Exemplary embodiments will be described in conjunction with the appended drawings, where like designations denote like elements.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, one or more embodiments are directed to detecting and tracking a capacitive pen in a sensing region of an input device. The capacitive pen is an active pen, which is capable of transmitting pen signals. To synchronize with a capacitive pen, the input display device transmits a beacon signal via sensing electrodes. A beacon signal is a signal from an input device to the capacitive pen. The capacitive pen uses the beacon signal as a way to control timing of the pen signals.

The challenge may occur when the input device is in a low ground mass (LGM) state and another input object (e.g., palm or finger) is in the sensing region with the pen. LGM is a state in which the input device does not have sufficient ground. For example, the input device may be located on a non-conductive insulated surface and may not be electrically coupled to the ground.

In the LGM state, the detection circuit in the capacitive pen may fail to detect the beacon signal transmitted by the input device. Specifically, the capacitive pen attempts to receive the beacon signal by interpreting the signal received at the tip on the pen relative to the body of the pen. In the LGM state with the user holding the pen and the user's palm or fingers touching the surface of the input device, the beacon signal to the pen is not received only at the tip, but is also conducted from surface of the display, through the user's hand to the body of the pen. Because the beacon signal is arriving at both the tip and the body of the pen, the difference between the tip and body is minimal Thus, interpreting the beacon signal received at the tip using the body of the pen can result in limited or no signal detected. In such a scenario when both the user's hand and the tip are in contact with the surface of the input device, the beacon signal can fall below the threshold of detectability. The user's palm or fingers effectively short circuit the beacon signal. Thus, the pen does not receive the beacon signal.

One or more embodiments detect and track the capacitive pen by focusing the transmission of the beacon signal onto particular sensor electrodes. Specifically, in one or more embodiments, only a subset of the sensor electrodes are driven with the beacon signal, while the remaining subset are disabled. The subset that is driven changes for consecutive frames in order to locate the input object and detect that the input object is a capacitive pen. Once the capacitive pen is located and detected, the system tracks the capacitive pen and transmits the beacon signal on a moving focus region defined by the location. For example, the focus region may be a centimeter to two centimeters squares. Other shapes and sizes of the focus region may be used without departing from the scope of the disclosure.

Figure 1:
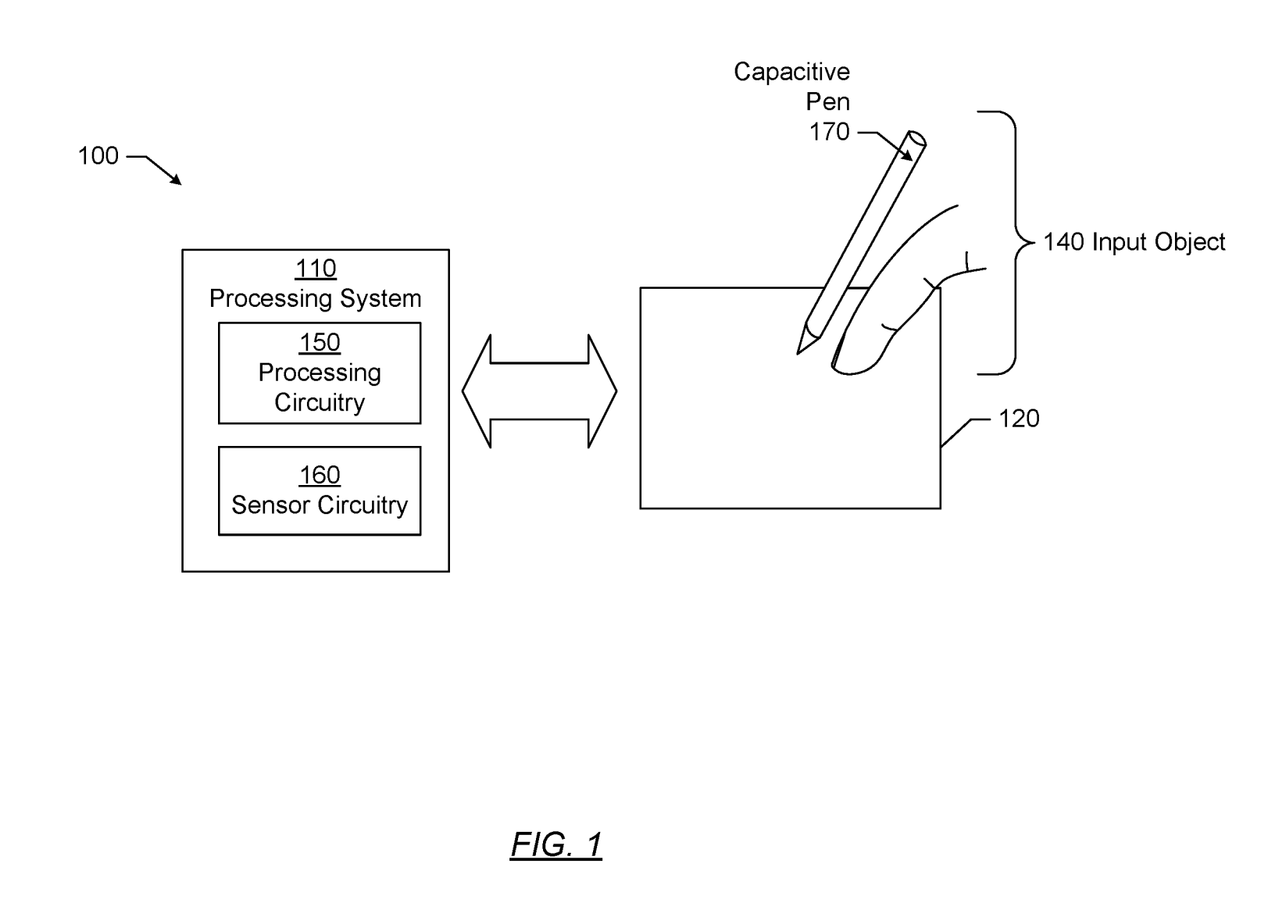
FIG. 1 is a block diagram of an example system that includes an input device in accordance with an embodiment of the disclosure.

Turning now to the figures, FIG. 1 shows a block diagram of an exemplary input device (100), in accordance with embodiments of the disclosure. The input device (100) may be configured to provide input to an electronic system (not shown for simplicity). The term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other examples include automotive user interfaces configured to give drivers user interface capabilities. Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies.

In the example of FIG. 1, the input device (100) may correspond to a proximity sensor device (such as a touchpad, touch screen, or any other touch sensor device) configured to sense input provided by one or more input objects (140) in a sensing region (120). Example input objects include fingers and capacitive pens (170). A capacitive pen (170) is an input object (140) that is configured to receive a beacon signal from the sensor electrodes and transmit a pen signal responsive to the beacon signal. The pen signal includes data transmitted by the capacitive pen (170). The capacitive pen (170) communicates capacitively with the sensor electrodes. Although the term "pen" is used, the pen may be any object that is localized on the screen and is configured to use a beacon signal from a sensing region.

An example of a capacitive pen (170) is a USI pen (e.g., USI stylus). In general, USI (Universal Stylus Initiative) defines standards for interoperable communication between pens and touch-enabled devices, such as tablets and phones. USI pens use two-way communication protocol in which the input device (100) transmits a beacon signal to the USI pen and the USI pen transmits a pen signal back to the input device (100). The beacon signal may be at a lower voltage than the pen signal. One challenge of two-way communication protocol is that when communication signal is not received by one side, communication fails. For example, when the beacon signal transmitted by the input device is not received by the pen, the pen does not send pen signals back to the input device. As a result, the input device does not detect the USI pen. To a user, the lack of detection appears as a lack of responsiveness of the user interface. For example, virtual "ink" may not appear on the screen.

Continuing with FIG. 1, the sensing region (120) may encompass any space above, around, in and/or near the input device (100) in which the input device (100) is able to detect user input (e.g., provided by one or more input objects (140)). The sizes, shapes, and locations of particular sensing regions may vary depending on actual implementations.

In some embodiments, the sensing region (120) extends from a surface of the input device (100) in one or more directions into space, for example, until a signal-to-noise ratio falls below a threshold suitable for object detection. For example, the distance to which this sensing region (120) extends in a particular direction, in various embodiments, may be on the order of less than a millimeter, millimeters, centimeters, or more, and may vary with the type of sensing technology used and/or the accuracy desired. In some embodiments, the sensing region (120) detects inputs involving no physical contact with any surfaces of the input device (100), contact with an input surface (e.g. a touch surface) of the input device (100), contact with an input surface of the input device (100) coupled with some amount of applied force or pressure, and/or a combination thereof.

In various embodiments, input surfaces may be provided by surfaces of a housing of the input device (100) within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") and/or mutual capacitance (Also referred to as "transcapacitance"). Absolute capacitance sensing methods detect changes in the capacitive coupling between sensor electrodes and an input object (140). Absolute capacitance sensing measures the self-capacitance of the sensor electrode, where the self-capacitance is the amount of electric charge that must be added to a sensor electrode to raise the sensor electrode's electric potential by one unit (e.g., one volt). The self-capacitance of the sensor electrode changes when an input object (140) is proximate to the sensor electrode. For example, an input object (140) near the sensor electrodes may alter the electric field near the sensor electrodes, thus changing the measured capacitive coupling. In some embodiments, the input device (100) may implement absolute capacitance sensing methods by modulating sensor electrodes with respect to a reference voltage (e.g., system ground), and detecting the capacitive coupling between the sensor electrodes and input objects. The reference voltage may be a substantially constant voltage, a varying voltage, or corresponds to a system ground. Measurements acquired using absolute capacitance sensing methods may be referred to as absolute capacitive measurements.

Transcapacitance sensing methods detect changes in the capacitive coupling between sensor electrodes. For example, an input object (140) near the sensor electrodes may alter the electric field between the sensor electrodes, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (e.g., system ground) to transmit transmitter signals while receiver sensor electrodes may be held at a substantially constant voltage relative to the reference voltage to receive resulting signals. The reference voltage may be a substantially constant voltage or may be system ground. The resulting signal may be affected by environmental interference (e.g., other electromagnetic signals) as well as input objects in contact with, or in close proximity to, the sensor electrodes. Sensor electrodes may be dedicated transmitters or receivers, or may be configured to both transmit and receive. Measurements acquired using mutual capacitance sensing methods may be referred to as mutual capacitance measurements.

When the capacitive pen is detected, the transmitter electrodes on the input device (100) are not used for location detection. Rather, the transmitter electrodes on the capacitive pen send the transmitter signals. The transmitter signals may also include data. Because the capacitive pen may move in and out of the sensing region, synchronization is performed for each sensing frame. The synchronization includes the input device periodically transmitting the beacon signal, which may be received by a capacitive pen (170). If the capacitive pen (170) receives and detects the beacon signal, then the capacitive pen (170) responds to the beacon signal with pen signals. The pen signals are signals from the transmitter electrode(s) of the capacitive pen (170). If the capacitive pen (170) does not receive the beacon signal, then the capacitive pen (170) determines that it is not adjacent to or in a sensing region (120) and does not send pen signals. If the input device does not receive pen signals responsive to the beacon signal, then the input device (100) performs capacitive sensing as described above to detect presence of other input objects, such as passive pens, fingers, palms, etc. that do not have transmitter electrodes.

One or more embodiments apply a two-stage solution to perform communication with capacitive pens. In the first stage, the capacitive pen is detected and generally located. In the second stage, the capacitive pen is tracked. The first stage involves driving different subsets of sensor electrodes in consecutive frames with a beacon signal in order to determine a location of the capacitive pen, if the capacitive pen is in the sensing region. In a first embodiment, the second stage may be performed by driving only those electrodes in the region near the capacitive pen with the beacon signal. In the first embodiment, the capacitive pen remains in a responsive mode of only outputting pen signals responsive to the beacon signal. In a second embodiment, where LGM conditions and a capacitive pen (170) are detected, the second stage is performed by switching the capacitive pen (170) to operate in a continuous tone mode. In continuous tone mode, the pen sends out a continuous pen signal regardless of whether a beacon signal is received by the capacitive pen (170). For example, the capacitive pen (170) streams out a continuous position tone. In this second embodiment, the capacitive pen (170) sends signals to the input device (100) independent of the capacitive pen (170) receiving the beacon signal.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

The processing system (110) may be configured to operate the hardware of the input device (100) to detect input in the sensing region (120). The processing system (110) may include parts of, or all of, one or more integrated circuits (ICs) and/or other circuitry components and firmware. In some embodiments, the processing system (110) may include processing circuitry (150) configured to determine when at least one input object (140) is in a sensing region (120), determine whether the input object (140) is a capacitive pen (170), determine signal to noise ratio, determine positional information of an input object (140), identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensor circuitry that is coupled to the sensor electrodes.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110). While many embodiments are described in the context of a fully-functioning apparatus, the mechanisms of are capable of being distributed as a program product (e.g., software) in a variety of forms.

Figure 2:
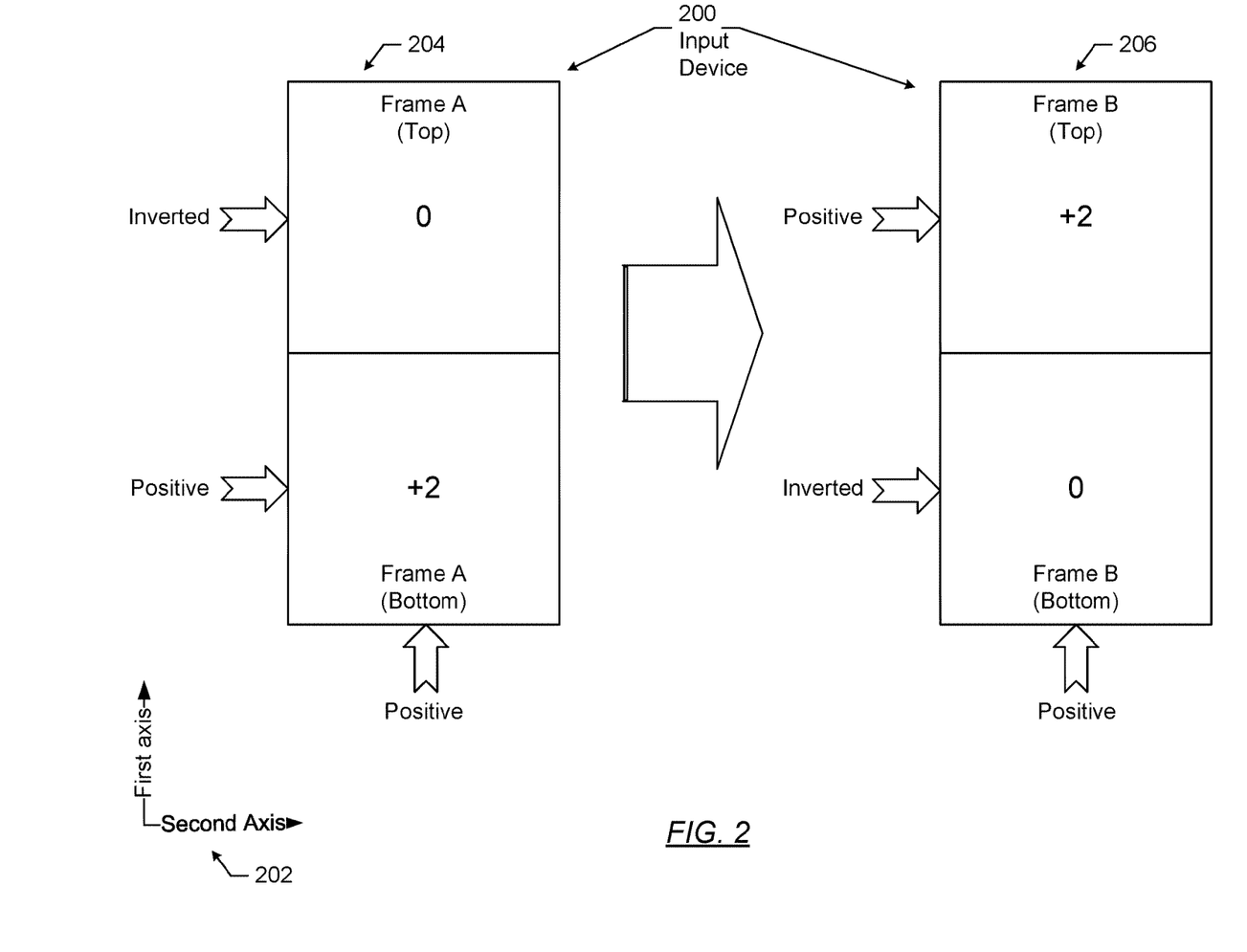
FIG. 2 shows an example of driving sensor electrodes with a beacon signal in accordance with embodiments of the disclosure.
Figure 3:
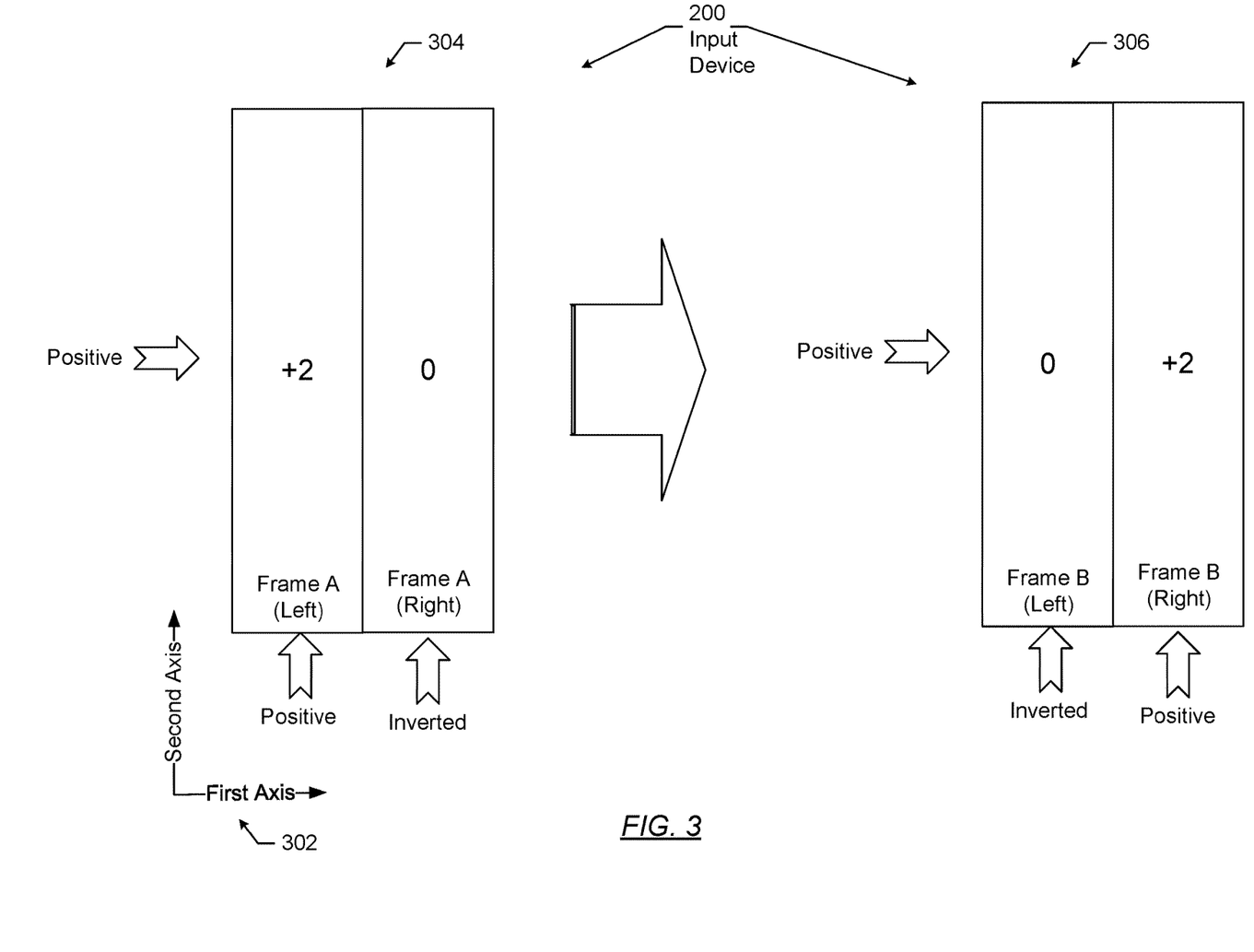
FIG. 3 shows an example of driving sensor electrodes with a beacon signal in accordance with embodiments of the disclosure.
Figure 4:
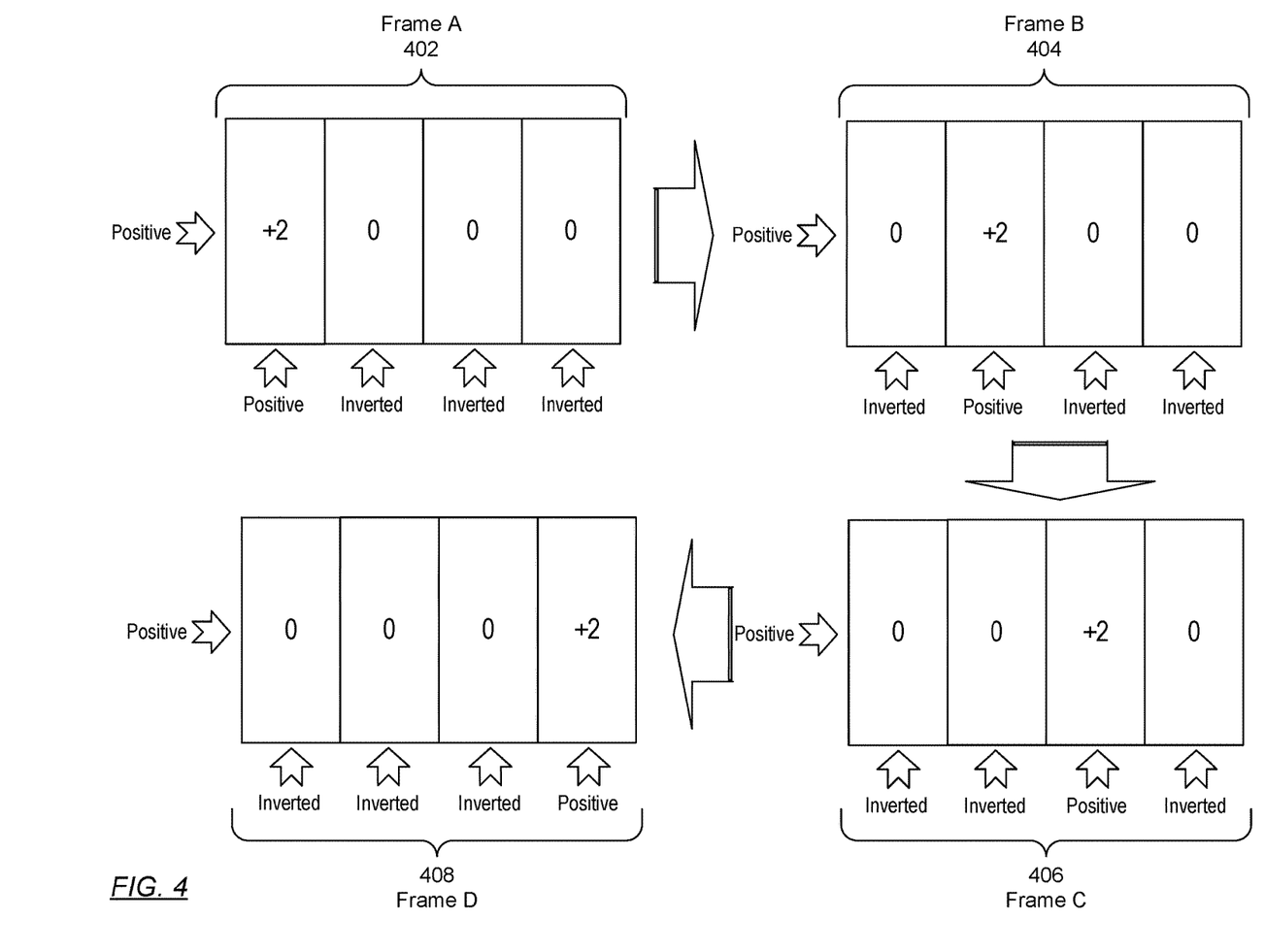
FIG. 4 shows an example of driving sensor electrodes with a beacon signal in accordance with embodiments of the disclosure.

Turning to FIGS. 2-4, FIGS. 2-4 show examples for driving subsets of the sensor electrodes with a beacon signal. In the present application, the term subset refers to a strict subset in which not all electrodes on a particular axis are driven. The subset of the sensor electrodes that are driven with the beacon signal defines a region of the input device. The region defined by a subset of sensor electrodes is contiguous. In FIGS. 2-4, each frame corresponds to a time period at which a beacon signal is transmitted. Additionally, in the frame, the pen signals may be detected. Thus, a beacon signal may be transmitted once per frame. The frame may or may not correspond to a full sensing frame of the sensing region.

FIG. 2 shows alternating pattern for transmitting the beacon signal on an input device (200). The input device (200) includes a first length along a first axis and a second length along the second axis. The first axis in FIG. 2 is a vertical axis and the second axis is the horizontal axis as shown in key (202). As shown, the first length is longer than the second length and is partitioned into two in order to create two regions. In one embodiment, the regions are of equal size and the beacon signal is transmitted using alternating top portion and bottom portion. In one embodiment, the regions are of unequal size. For example, in one embodiment, the driven portion is slightly larger than the net-zero half. Thus, if a pen lands in the middle of the sensing region, the pen can still be detected. The alternating pattern may cause, for example, an 8-millisecond delay for detecting the capacitive pen as compared to driving the entire sensing region in a single frame.

In the example shown in FIG. 2, the first half of the input device (e.g., bottom) is driven with a positive beacon signal during a first frame (e.g., frame A (204)). Then, in a second frame (e.g., frame B (206)), the pattern is reversed and the top half is driven with the positive beacon signal. Specifically, in frame A (204), the first subset of sensor electrodes that each span the second axis (e.g., the rows or horizontal sensor electrodes) and are on the bottom half are driven with a positive beacon signal while the remaining subset of sensor electrodes that each span the second axis and are on the top half are driven with an inverted beacon signal. Further, in frame A (204), the sensor electrodes that each span the first axis (e.g., column or vertical sensor electrodes) are driven with the positive beacon signal. The result of the driving is net two positive beacon signal on the bottom half and a net zero beacon signal on the top half.

In frame B (206), the second subset of sensor electrodes are driven with a positive beacon signal while the first subset of sensor electrodes are driven with an inverted beacon signal. The sensor electrodes that each span the first axis (e.g., column or vertical sensor electrodes) are driven with the positive beacon signal. The result of the driving is net two positive beacon signal on the top half and a net zero beacon signal on the bottom half.

The alternating pattern may repeat by alternating between the driving of frame A (204) and frame B (206). Further, in some embodiments, rather than driving with an inverted beacon signal, the driving of the sensor electrodes shown as inverted in FIG. 2 may be disabled.

Additionally, in some embodiments, the capacitive pen is configured to respond to an inverted beacon signal as well as a positive beacon signal. In such a scenario, if the vertical sensor electrodes are driven with an inverted beacon signal and the horizontal sensor electrodes are driven as shown, then a net negative two beacon signal is detected in the top half of frame A and zero on the bottom half, and reverse for frame B. The capacitive pen in such a scenario still detects the inverted beacon signal and responds accordingly. Thus, transmission of the beacon signal may be transmission of the inverted beacon signal or transmission of the positive beacon signal in such embodiments.

FIG. 2 may be performed to find a capacitive pen and large input object at opposite ends of the screen. Namely, if a user has the pen touching on the top half and palm resting on the bottom half, the capacitive pen will detect the beacon signal at Frame B and respond to the beacon signal because both the palm and the tip of the pen are not concurrently receiving the same beacon signal.

FIG. 3 shows another possible technique to drive the display screen. In FIG. 3, rather than top and bottom regions shown in FIG. 2, the driving is left region versus right region. Namely, the first axis is the horizontal axis and the second axis is the vertical axis as shown in key (302). The length of the input device (200) along the first axis is shorter than the length along the second axis. The remaining aspects of FIG. 3 are similar to that discussed above with reference to FIG. 2. In frame A (304), the first subset of sensor electrodes that each span the second axis (e.g., vertical sensor electrodes) and are on the left half are driven with a positive beacon signal while the remaining subset of sensor electrodes that each span the second axis and are on the right half are driven with an inverted beacon signal. Further, in frame A (304), the sensor electrodes that each span the first axis (e.g., horizontal sensor electrodes) are driven with the positive beacon signal. The result of the driving is net two positive beacon signal on the left half and a net zero beacon signal on the right half.

In frame B (306), the second subset of sensor electrodes are driven with a positive beacon signal while the first subset of sensor electrodes are driven with an inverted beacon signal. The sensor electrodes that each span the first axis are driven with the positive beacon signal. The result of the driving is net two positive beacon signal on the right half and a net zero beacon signal on the left half.

FIG. 4 shows another possible configuration. In FIG. 4, the sensor electrodes are partitioned into more than two subsets (e.g., four subsets) to create regions. The driving of the beacon signal is performed by iterating through regions as shown in frame A (402), frame B (404), frame C (406), and frame D (408). In each frame, the beacon signal is transmitted in a single region. Accordingly, the input device transitions between the first subset, the second subset, the third subset, and the fourth subset through subsequent sensing frames. Driving of the sensor electrodes is performed as described above with reference to FIGS. 2 and 3.

In FIGS. 2-4, the region being sensed may be larger than the region prior to sensing. Specifically, the size of the region may be expanded as shown when the beacon signal is transmitted in the region. Thus, a pen located at the border is still detected. Other configurations are possible besides those shown in FIGS. 2-4.

A capacitive pen is detected because the pen receives the beacon signal and transmits pen signals that include data. Thus, the pen signals transmitted by the capacitive pen may be used to detect the capacitive pen and the location thereof.

Figure 5:
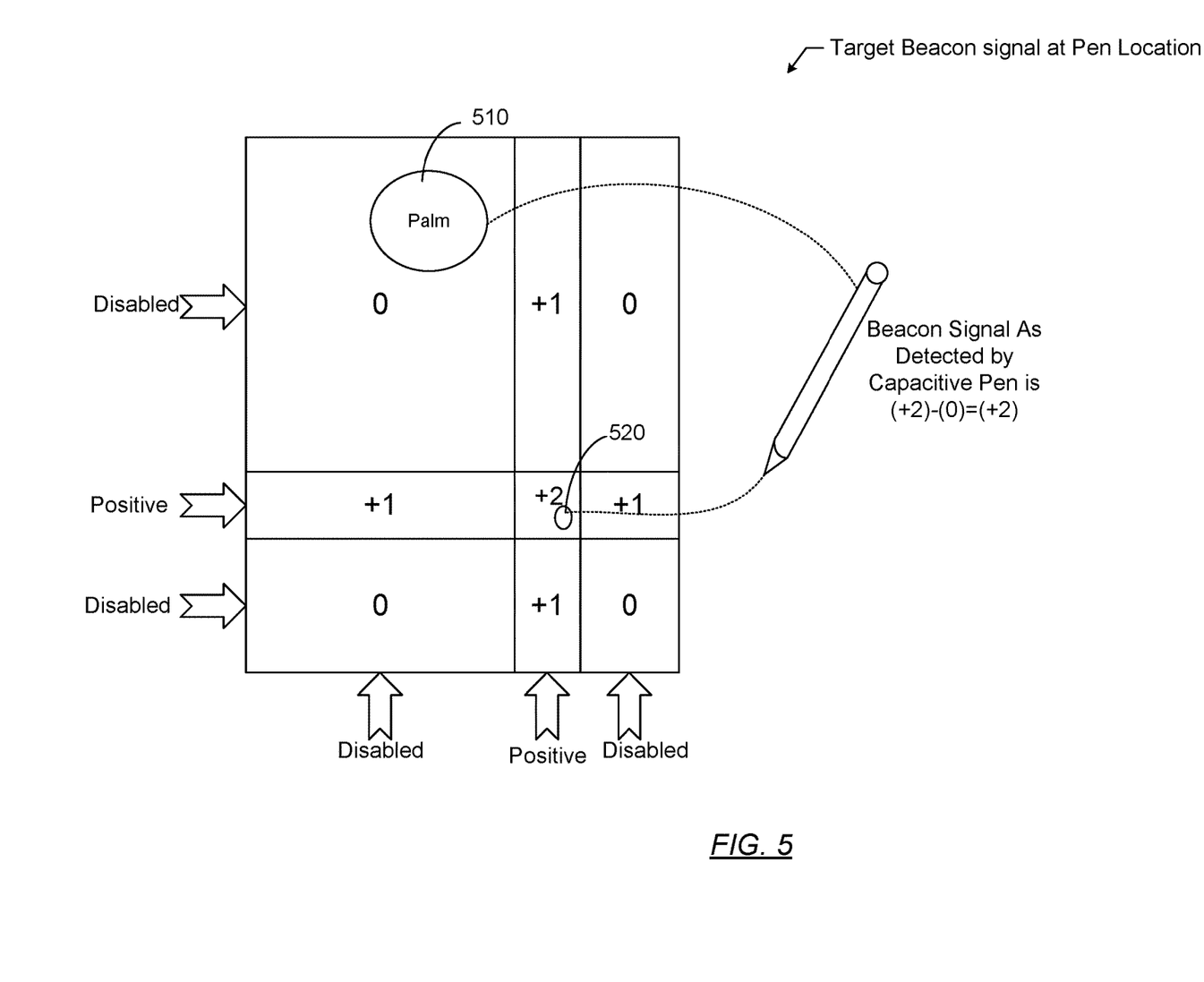
FIG. 5 shows an example of tracking a capacitive pen with a beacon signal in accordance with embodiments of the disclosure.

When the capacitive pen is detected, beacon signal transmission is performed in a localized area (e.g., focus region). The focus region is a moving focus region because the focus region changes as the capacitive pen moves. FIG. 5 shows an example of detection in the moving focus region. Through each cycle of the frames, the moving focus region of detection is moved with the pen. Next, the system goes into a "lock" mode in which the beacon signal follows the pen via "focused" transmissions while "suppressing" any and all touch objects. If any finger/palm touch object is present, the process works as follows. The size, shape and location of touch objects is not used (completely ignored) in one or more embodiments. Rather, the focus is solely on the pen, which is to say, finding the pen and then "locking" onto the pen. By locking onto the pen, the other input objects are "mask out." As shown in FIG. 5, the remaining sensor electrodes that do not span the location of the moving focus region may be disabled.

In the example of FIG. 5, assume there are 40 electrodes on the long axis. The beacon signal may be transmitted on the 6 closest electrodes to the location of the capacitive pen (520). The other 34 electrodes will transmit an inverted or null uplink (depending on the axis). As the pen moves laterally, slow or fast, the beacon signal follows and keeps up with the pen. The transmission pattern of FIG. 5 is designed to maximize the "value" near the pen (e.g. +2) and minimize the value at all other areas (ranges from +1 to ~1). Thus, a palm (510) that is in a sensing region defined by the intersection of two disabled subsets of sensor electrodes receives a zero beacon signal. The delta between the two determines the signal level as seen by the pen attempting to receive the beacon signal. In the example, the delta beacon signal received by the pen is +2 because signal received at the pen tip is +2 and the signal received at the pen body is 0. Thus, the delta is +2. For multiple touch objects, the delta is some complex combination of deltas between tip and the touched regions.

Without embodiments described, the entire screen will be +2. In such a case, in LGM condition, a USI pen will not receive a beacon signal because the delta will be 0=(+2)−(+2).

In another technique that may be combined with the above in some embodiments, other input objects (e.g., fingers or palms) may be detected and the locations identified. The driving of the beacon signal in the locations of the other input objects may be inverted.

In the example of FIG. 5, the location of the capacitive pen (520) is tracked through a series of frames and the beacon signal transmitted on the moving focus region. The moving focus region is defined by driving a first changing subset of sensor electrodes along the first axis and a second changing subset of sensor electrodes along a second axis while disabling or inverting the signal on the remaining sensor electrodes. The subset driven is shown in FIG. 5 with a positive signal. The subset is a changing subset in that sensor electrodes that are part of the subset changes with the location of the capacitive pen as the capacitive pen moves.

Figure 6:
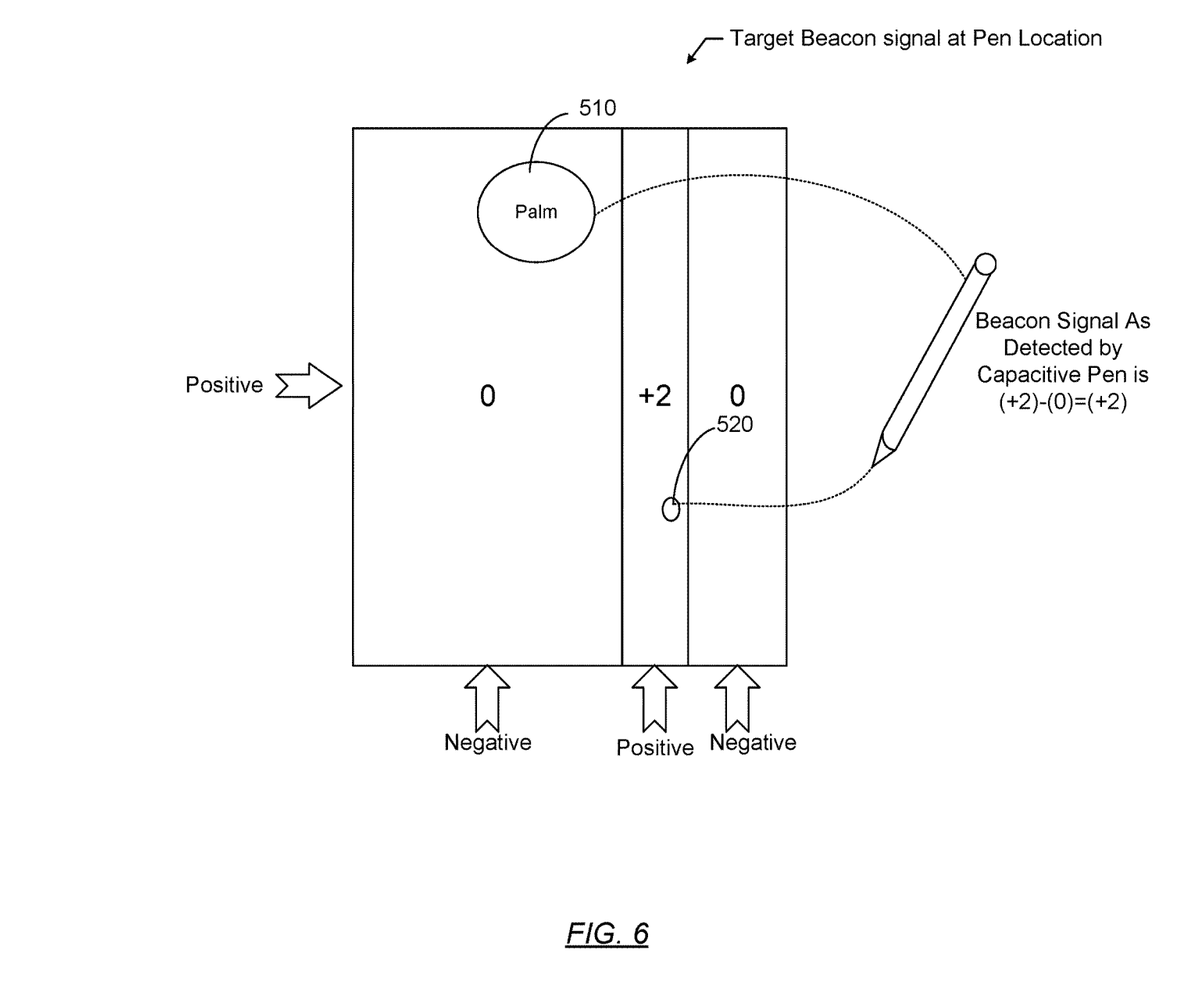
FIG. 6 shows an example of tracking a capacitive pen in accordance with one or more embodiments of the disclosure.

Another example is shown in FIG. 6 and achieves a similar effect to FIG. 5, but with different techniques. In FIG. 6, the changing subset of sensor electrodes is only along a first axis, which are driven with a positive beacon signal. Remaining sensor electrodes along the first axis may be driven with an inverted or negative beacon signal. Along the second axis, each sensor electrode may be driven with a positive beacon signal. Thus, the result is as shown in FIG. 6, whereby the capacitive pen (520) receives a net two positive beacon signal.

Figure 7:
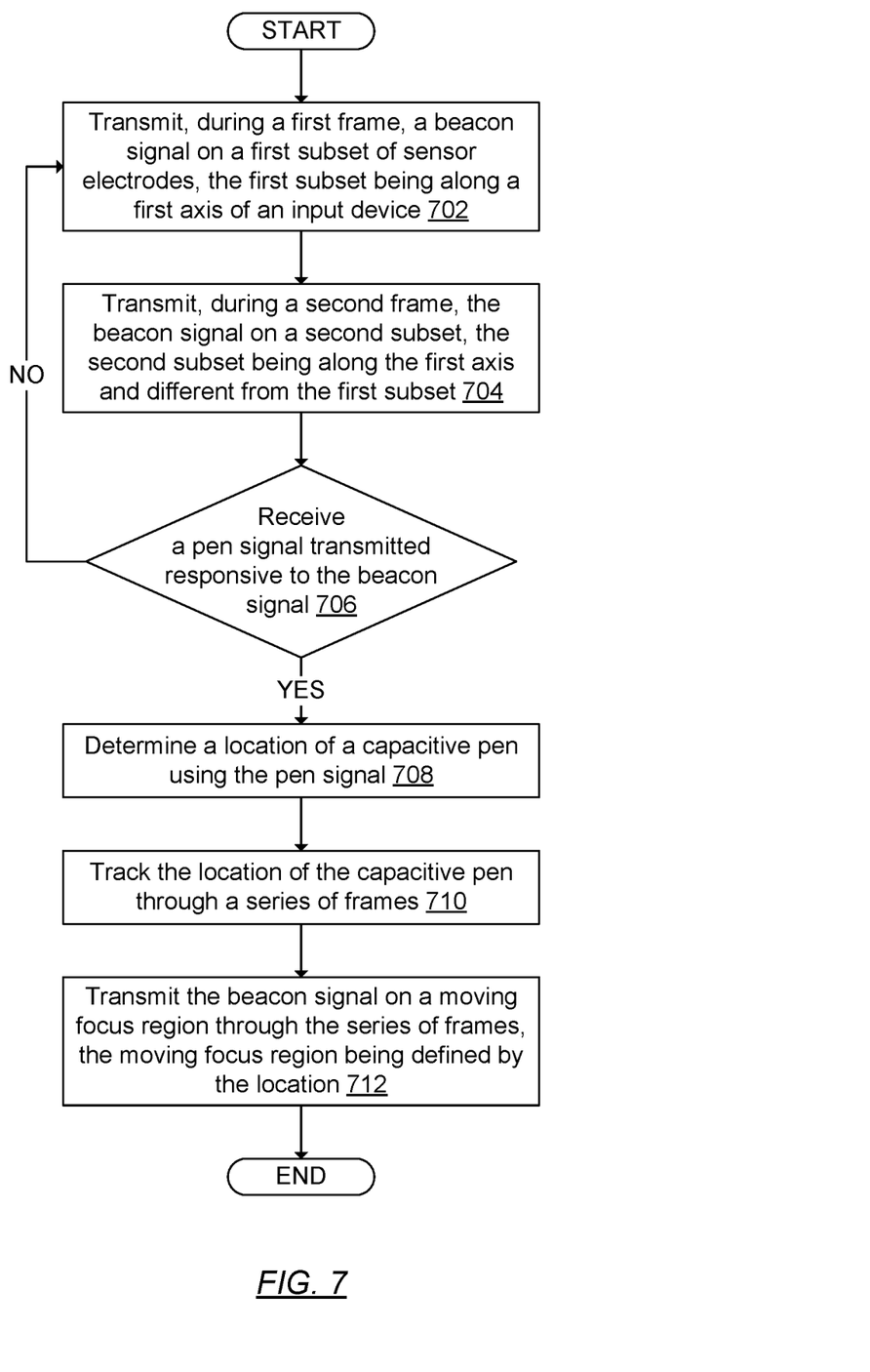
FIG. 7 shows a flow diagram in accordance with one or more embodiments of the disclosure.

FIG. 7 shows a flow diagram in accordance with one or more embodiments. In Block 702, during a first frame, a beacon signal is transmitted on a first subset of sensor electrodes along a first axis of the input device. In Block 704, during a second frame, the beacon signal is transmitted on a second subset of sensor electrodes along the first axis of the input device. The first subset is different than the second subset, and may be overlapping. The input device determines whether a pen signal is received in Block 706. If no pen signal is received, blocks 702 and 704 may be repeated. If, in Block 706, a pen signal is received, the input device may switch to the second stage to track the capacitive pen.

In Block 708, the location of the capacitive pen is determined using the pen signal. The location is detected based on which sensor electrodes received the pen signal. In Block 710, the location of the capacitive pen is tracked through a series of frames. As the capacitive pen moves, the location of the capacitive pen is updated based on the pen signals. The beacon signal is transmitted on the moving focus region through the series of frames, whereby the beacon signal is defined by the location in Block 712. The size of the moving focus region may be selected so that if the capacitive pen remains in the sensing region, the moving focus region remains overlapping with the pen tip.

Figure 8:
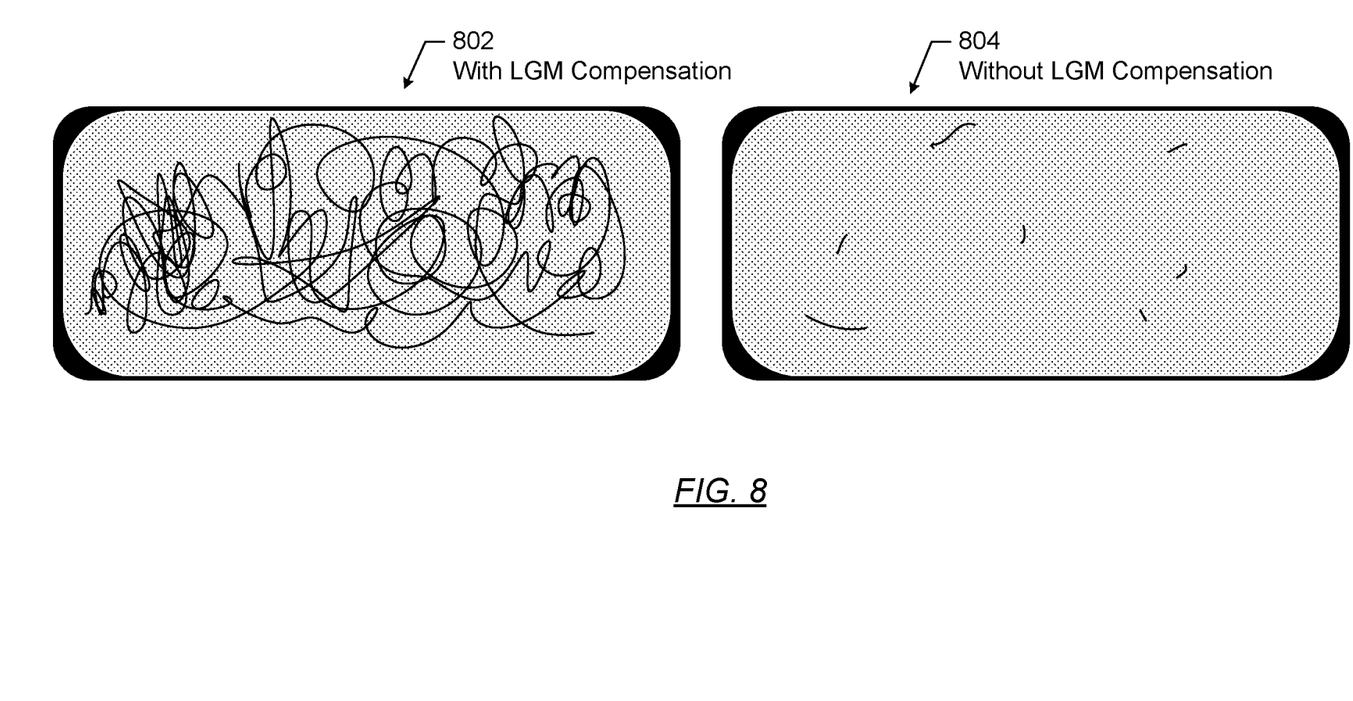
FIG. 8 is an example of a mobile device output based on a beacon signal in accordance with disclosed embodiments.

FIG. 8 shows an illustrated example of the display of a mobile device with and without the above techniques when the electronic device (e.g., a mobile phone in the example) is in a low ground mass state. The left side (802) shows an example of the above techniques in use while the right side (804) shows an example of the technique not in use. In both the left and right side, a USI pen is scribbling on the touchscreen. Virtual ink is shown on the screen where the pen or fingers are detected. In the example, consider the scenario in which the user did approximately the same drawing. As shown on the right side (804) as compared to the left side (802), because the USI pen is not receiving the uplink signal, the pen drops out and does not draw close to 100%. Namely, the beacon signal is almost never seen by the capacitive pen, so capacitive pen is not transmitting the location tone or pen signals. In contrast, on the left side (802) as shown by the continuous line, the pen is almost 100% seen.

As shown one or more embodiments provide a technique to transmit a beacon signal when a palm or other input object is on the input device and connected to the body of the capacitive pen. Further, one or more embodiments may be used to reduce display artifacts that result from the beacon signal. Specifically, by transmitting lower voltages, the display artifacts or artifacts in a display image on the input display device may be reduced.

Although the above is described with respect to uplink signals, any beacon signals may be used. For example, embodiments may be applied to near field communication (NFC).

Throughout the application, ordinal numbers (e.g., first, second, third, etc.) are used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system, comprising:
sensing circuitry configured to:
transmit, during a first frame, a beacon signal on a first subset of a plurality of sensing electrodes, wherein the first subset is along a first axis of an input device and defines a first contiguous region;
transmit, during a second frame, the beacon signal on a second subset of the plurality of sensing electrodes, wherein the second subset is along the first axis, is different from the first subset, and defines a second contiguous region; and
receive a pen signal transmitted responsive to the beacon signal; and
processing circuitry configured to:
detect a location of a capacitive pen using the pen signal.

2. The processing system of claim 1, wherein the processing circuitry is further configured to: track the location of the capacitive pen through a series of frames; and
wherein the sensing circuitry is further configured to: transmit the beacon signal on a moving focus region through the series of frames, the moving focus region being defined by the location.

3. The processing system of claim 2, wherein transmitting the beacon signal on the moving focus region comprises:
driving a first changing subset of sensor electrodes along the first axis and a second changing subset of the plurality of sensing electrodes along a second axis.

4. The processing system of claim 2, wherein transmitting the beacon signal on the moving focus region comprises:
driving a first changing subset of the plurality of sensing electrodes along the first axis and a second changing subset of the plurality of sensing electrodes along a second axis with a positive beacon signal; and
disabling a remaining subset of the plurality of sensing electrodes along the first axis and the second axis;
wherein the first changing subset and the second changing subset intersect at the moving focus region.

5. The processing system of claim 2, wherein transmitting the beacon signal on the moving focus region comprises:
driving a first changing subset of the plurality of sensing electrodes along the first axis with a positive beacon signal;
driving a remaining subset of the plurality of sensing electrodes along the first axis with a negative beacon signal; and
driving each sensing electrode along a second axis with a positive beacon signal;
wherein the moving focus region is along a length of the first changing subset.

6. The processing system of claim 1, wherein the first contiguous region and the second contiguous region are halves of the input device.

7. The processing system of claim 1, wherein the sensing circuitry is further configured to:
transmit, during a third frame, a beacon signal on a third subset of the plurality of sensing electrodes; and
transmit, during a fourth frame, the beacon signal on a fourth subset of the plurality of sensing electrodes;
wherein the first subset, the second subset, the third subset, and the fourth subset are different.

8. The processing system of claim 1, wherein the sensing circuitry is configured to transition between respective subsets of the plurality of sensing electrodes through respective frames.

9. A method, comprising:
transmitting, during a first frame, a beacon signal on a first subset of a plurality of sensing electrodes, wherein the first subset is along a first axis of an input device and defines a first contiguous region;
transmitting, during a second frame, the beacon signal on a second subset of the plurality of sensing electrodes, wherein the second subset is along the first axis, is different from the first subset, and defines a second contiguous region;
receiving a pen signal transmitted responsive to the beacon signal; and
detecting a location of a capacitive pen using the pen signal.

10. The method of claim 9, further comprising:
tracking the location of the capacitive pen through a series of frames; and
transmitting the beacon signal on a moving focus region through the series of frames, the moving focus region being defined by the location.

11. The method of claim 10, wherein transmitting the beacon signal on the moving focus region comprises:
driving a first changing subset of the plurality of sensing electrodes along the first axis and a second changing subset of the plurality of sensing electrodes along a second axis with a positive beacon signal; and
disabling a remaining subset of the plurality of sensing electrodes along the first axis and the second axis;
wherein the first changing subset and the second changing subset intersect at the moving focus region.

12. The method of claim 10, wherein transmitting the beacon signal on the moving focus region comprises:
driving a first changing subset of the plurality of sensing electrodes along the first axis with a positive beacon signal;
driving a remaining subset of the plurality of sensing electrodes along the first axis with a negative beacon signal; and
driving each sensing electrode along a second axis with a positive beacon signal;
wherein the moving focus region is along a length of the first changing subset.

13. The method of claim 9, further comprising:
transmitting, during a third frame, a beacon signal on a third subset of the plurality of sensing electrodes; and
transmitting, during a fourth frame, the beacon signal on a fourth subset of the plurality of sensing electrodes,
wherein the first subset, the second subset, the third subset, and the fourth subset are different.

14. The method of claim 13, further comprising:
transitioning between the first subset, the second subset, the third subset, and the fourth subset through respective frames.

15. An input device, comprising:
a plurality of sensing electrodes comprising a first subset and a second subset, the plurality of sensing electrodes configured to:
transmit, during a first frame, a beacon signal on the first subset, wherein the first subset is along a first axis of the input device and defines a first contiguous region;

transmit, during a second frame, the beacon signal on the second subset, wherein the second subset is along the first axis, is different from the first subset, and defines a second contiguous region; and receive a pen signal responsive to the beacon signal; and a processing system coupled to the plurality of sensing electrodes, the processing system configured to:

detect a location of a capacitive pen using the pen signal.

16. The input device of claim 15, wherein the processing system is further configured to:

track the location of the capacitive pen through a series of frames; and transmit the beacon signal on a moving focus region through the series of frames, the moving focus region being defined by the location.

17. The input device of claim 16, wherein transmitting the beacon signal on the moving focus region comprises:

driving a first changing subset of the plurality of sensing electrodes along the first axis and a second changing subset of the plurality of sensing electrodes along a second axis.

18. The input device of claim 15, wherein the input device comprises a first length along the first axis that is longer than a second length along a second axis of the input device.

19. The input device of claim 15, wherein the plurality of sensing electrodes is configured to transition between respective subsets through respective frames.

* * * * *